(12) United States Patent
Willson et al.

(10) Patent No.: US 9,163,397 B2
(45) Date of Patent: Oct. 20, 2015

(54) FOIL-BACKED WALLBOARD AND INSULATION SYSTEM

(75) Inventors: Jennifer M. Willson, San Antonio, TX (US); David W. Yarbrough, Cookeville, TN (US); John Wade Mixson, Charlotte, NC (US)

(73) Assignee: National Gypsum Properties, LLC, Charlotte, NC (US)

( * ) Notice: Subject to any disclaimer, the term of this patent is extended or adjusted under 35 U.S.C. 154(b) by 219 days.

(21) Appl. No.: 13/187,646

(22) Filed: Jul. 21, 2011

(65) Prior Publication Data

US 2012/0021172 A1    Jan. 26, 2012

Related U.S. Application Data

(60) Provisional application No. 61/367,233, filed on Jul. 23, 2010.

(51) Int. Cl.
| | | |
|---|---|---|
| *B32B 3/24* | (2006.01) | |
| *E04B 1/80* | (2006.01) | |
| *B32B 3/26* | (2006.01) | |
| *B32B 13/14* | (2006.01) | |
| *B32B 15/14* | (2006.01) | |
| *B32B 15/20* | (2006.01) | |
| *B32B 17/02* | (2006.01) | |
| *B32B 17/06* | (2006.01) | |
| *E04B 2/70* | (2006.01) | |
| *E04C 2/04* | (2006.01) | |
| *E04B 1/76* | (2006.01) | |

(52) U.S. Cl.
CPC . *E04B 1/80* (2013.01); *B32B 3/266* (2013.01); *B32B 13/14* (2013.01); *B32B 15/14* (2013.01); *B32B 15/20* (2013.01); *B32B 17/02* (2013.01); *B32B 17/061* (2013.01); *E04B 2/707* (2013.01); *E04C 2/043* (2013.01); *E04B 2001/7691* (2013.01); *Y10T 428/24273* (2015.01); *Y10T 428/24331* (2015.01); *Y10T 428/31678* (2015.04)

(58) Field of Classification Search
CPC ........... E04B 1/80; B32B 3/266; B32B 13/06; Y10T 428/24331
USPC ......................................................... 428/138
See application file for complete search history.

(56) References Cited

U.S. PATENT DOCUMENTS

| | | |
|---|---|---|
| 4,726,985 A | 2/1988 | Fay |
| 5,231,814 A * | 8/1993 | Hageman ........................ 52/408 |

(Continued)

OTHER PUBLICATIONS

International Search Report and Written Opinion for International Application PCT/US2011/044946, mailed Dec. 23, 2011.

*Primary Examiner* — William P Watkins, III
(74) *Attorney, Agent, or Firm* — Ice Miller LLP (57) ABSTRACT

An insulated exterior wall assembly combining insulating material and reflective surface insulation coupled with an air gap. A wall assembly according to this invention includes wall support studs defining insulation cavities between them, sheathing boards facing the building exterior, an insulating material such as cellular plastic material or fibrous insulation applied from the exterior sheathing partly through the depth of the insulation cavities, a foil-backed gypsum-containing wallboard applied to the interior facing portions of the studs, with an air gap between the foil backing of the wallboards and the surface of the foam along the depth of the studs. The wall assembly according to this invention provides comparable thermal resistance compared to a deep layer of insulating material.

27 Claims, 3 Drawing Sheets

(56) References Cited

U.S. PATENT DOCUMENTS 6,251,495 B1 * 6/2001 Wilson et al. ............... 428/133
6,800,352 B1 * 10/2004 Hejna et al. ................. 428/138

2004/0103610 A1 6/2004 Axsom
2005/0287293 A1 12/2005 Rothman
2008/0245007 A1 10/2008 McDonald

* cited by examiner

FOIL-BACKED WALLBOARD AND INSULATION SYSTEM

This application claims priority under 35 U.S.C. §119(e) to U.S. Provisional Patent App. Ser. No. 61/367,233, filed Jul. 23, 2010.

BACKGROUND

Improved insulation systems for exterior walls of residential and commercial structures have received interest in an age of rising energy costs, and concerns about greenhouse gas emissions of heating fuels.

Standard frame walls are 8 feet to 12 feet high. Older homes and warmer climates typically utilize nominal 2×4 in. wall studs (having actual cross-section dimensions of 1.5 inches by 3.5 inches). Newer homes in colder climates may utilize nominal 2×6 studs (actually 1.5 inches by 5.5 inches), to allow more space in the wall cavity for insulation.

Framing consists of top and bottom plates, wall studs and headers, with trimmers and king studs as needed for window and door openings. Exterior sheathing, typically 4×8 (or 4×9) oriented strand board or plywood sheets, is nailed to the outer face of the frame formed by the wall studs. Interior wallboards, typically gypsum-containing wallboards, are then fastened to the interior facings of the studs, after insulating, wiring, and plumbing of the insulation cavity is completed. The depth of the insulation cavity depends on the depth of the studs used, with a cavity 3.5 inches deep for 2×4 in. studs, and 5.5 inches deep for 2×6 in. studs.

A long-known form of insulation comes in the form of fibrous insulation, including mineral fiber, glass fiber, cellulose, cotton, polyester fiber, wool, and wood fiber. One common embodiment is fiberglass batts that are unrolled and cut (if necessary) to fit in the space between support studs of a building, generally occupying the entire depth of the insulation cavity between the exterior sheathing and interior walls.

A more recent advance has been the use of cellular plastic insulation in place of fibrous insulation. Cellular plastic insulation includes products such as spray-applied polyurethane, polyurethane foam board, polyisocyanurate, Icynene®, phenolic foam, and polystyrene foam and board stock. Polyurethane foam is a common cellular plastic insulation, which may be open cell or closed cell, and is applied into the cavities between the studs, starting at the inner facing of the exterior sheathing, and applied from the inner facing to a predetermined thickness. Closed-cell cellular plastic insulation has advantages over fibrous insulation, including superior vapor retarding properties and superior thermal resistance per unit thickness. Cellular plastic insulation has a disadvantage of being higher in cost than fibrous insulation products.

There are a number of terms used to quantify the thermal performance of an insulation product. The most common is the thermal resistance, or R-value, which is the ratio of the temperature difference across an insulator to the heat flux (heat flow per unit area) through the insulator. In the United States, R-value is usually expressed as a quantity in $ft^{2.°}F \cdot h/Btu$. All R-values in the application are presented in these units. The larger the R-value, the better the building insulation's effectiveness. The R-value can be increased by increasing the thickness of the applied layer. Closed-cell foam has the advantage over fiberglass insulation of providing higher R-values for the same thickness of insulation. However, because cellular plastic insulation is an expensive building component, a need exists for a system to enhance the thermal performance of an insulation system by a means other than simply increasing the amount of insulation used in the cavity.

SUMMARY

In one embodiment of the present invention, an insulated exterior wall system in a building is provided, with framing studs placed a uniform distance apart along an exterior portion of a building, each of the studs having a length, width and a depth, a surface spanning the width of each stud facing outward of the building, a second surface spanning the width of each stud facing the interior of the building. The studs may be nominal 2×4 in. studs, and may be placed 16 inches on center. Sheathing boards are fastened to the outward-facing surfaces of the studs so as to cover the area between the exterior-facing surfaces of the studs, the boards having an exterior face and an interior face. Wallboards are fastened to the interior-facing surfaces of the framing studs so as to cover the area between interior-facing surfaces of the studs. Either the interior wallboards or the sheathing boards are made from gypsum and have at least one low-emittance surface, having an emittance of less than 0.25, preferably less than 0.1, facing inward into the insulation cavity, with the studs, the sheathing boards, and wallboards defining an insulation cavity having a depth equal to the depth of the studs. A layer of insulating material facing inward into the insulation cavity is applied to the cavity-facing face of the other of the sheathing boards or wallboards to fill the insulation cavity for a portion of the depth of the cavity, and an air gap is provided between the low-emittance surface material of the wallboards and the top surface of the layer of insulating material.

The insulating material of the invention may be cellular plastic material or fibrous insulation, and may be sprayed on the cavity or applied in preformed slabs or batts.

The low-emittance surface may be produced by coating a surface of a gypsum-containing board with a low emittance coating, or by laminating a metallic foil or film onto one face of the gypsum-containing board. A metallic foil or film used as a low emittance surface may be perforated before or after lamination so that the gypsum-containing board with the metallic foil or film surface has a water vapor permeance greater than 1 Perm, preferably greater than 5 Perms.

In another embodiment, a gypsum-containing board is provided with a core comprising gypsum having a first and second face. One face of the gypsum-containing wallboard has a low emittance surface with an emittance of less than 0.25, most preferably less than 0.1. The low-emittance surface may be produced by coating a surface of the wallboard with a low emittance coating, or by laminating a metallic foil or film onto one face of the gypsum-containing wallboard.

A metallic foil or film used as a low emittance surface may be perforated before or after lamination so that the gypsum-containing wallboard with the metallic foil or film surface has a water vapor permeance greater than 1 Perm, preferably greater than 5 Perms. The facing or core of the gypsum-containing board may contain additives to enhance mold resistance.

In another embodiment, a method for insulating an exterior wall cavity between two or more studs placed a uniform distance apart along an exterior portion of a building, with boards fastened to either the interior or exterior surfaces of the studs facing the wall cavity. The method has the steps of applying an insulation layer onto the cavity-facing face of the boards so as to partially fill the depth of the exterior wall cavity, then fastening a gypsum-containing board having a low-emittance surface covering one face to the other of the interior or exterior surfaces of the studs. The space between the low-emittance surface of the gypsum-containing wallboard and the insulation layer should have a depth of 1 inch or greater.

The low-emittance surface may be produced by coating a surface of the wallboard with a low emittance coating, or by laminating a metallic foil or film onto one face of the gypsum-containing board.

DETAILED DESCRIPTION

Figure 1:
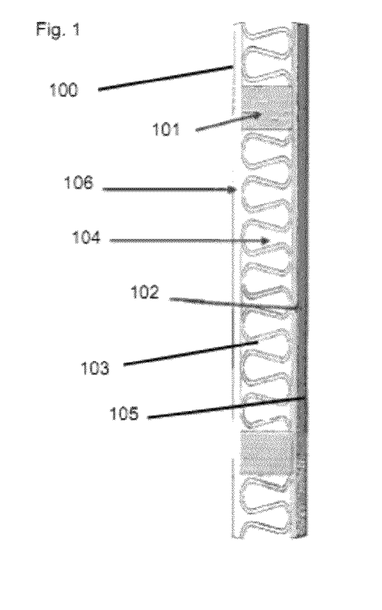
FIG. 1 is a top cutaway view of an insulated exterior wall structure according to the prior art.
Figure 2:
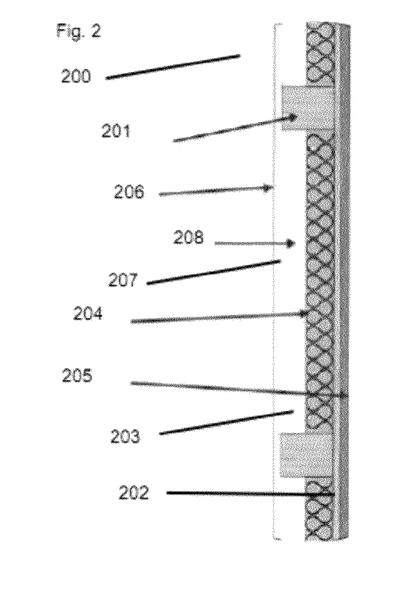
FIG. 2 is a cutaway view of an insulated exterior wall structure according to the present invention.

FIG. 1 shows a prior art insulating system 100 in a cutaway view between the top and bottom plates of the framing. A series of nominal 2×4 in. studs 101 are spaced with 16 inches on-center between the studs. The studs may also be placed at different distances. The most common spacing, other than 16 inches on-center, is typically 24 inches on-center. The studs are typically wooden, but may be metal or other material. The studs may also be 2×6 in. studs (having actual dimensions of 1.5 in.×5.5 in.), especially in colder climates, were a deeper cavity is required to achieved code-specified thermal resistance. An exterior sheathing material 102, such as OSB, plywood, or gypsum-containing sheathing, is nailed, screwed or otherwise affixed to the width of the studs 101. Siding material 105, such as shingles, vinyl siding, or wood slats, may be affixed to the sheathing material 102. The depth of the studs 101 and the surface of the sheathing material 102 form an insulation cavity 103 where insulating material is applied. The insulation cavity 103 in this system is occupied by a fiberglass batt 104 that occupies the insulation cavity formed by the 2×4 in. studs. The interior width of the 2×4 in. studs has a ½ inch gypsum-containing wallboard 106 affixed thereon to cover the insulation cavity from the building interior. Typically, gypsum-containing wallboards are faced with kraft-type paper but may also be faced with coated or uncoated fiberglass mats. Gypsum-containing wallboards and exterior sheathing (such as OSB, plywood or gypsum) boards have much lower thermal resistance than the fiberglass insulation. The fiberglass batt having the thickness shown (about 3.5 inches, the depth of a 2×4 in. stud) typically has an R-value of approximately 13 $ft^{2.°}$ F.·h/Btu FIG. 2 shows a cutaway view of an insulated exterior wall structure 200 of the present invention. A series of 2×4 in. studs 201 are spaced with 16 inches on-center between the studs. The studs are typically wooden, but may be metal or other material. The studs may also be 2×6 in. studs (having actual dimensions of 1.5 inches by 5.5 inches), especially in colder climes that require more insulation. An exterior sheathing material 202 is nailed, screwed or otherwise affixed to the width of the studs 201. Siding material 205, such as shingles, vinyl siding, or wood slats, may be affixed to the sheathing material 202. The depth of the studs 201 and the surface of the sheathing material 202 form an insulation cavity 203 where insulating material is applied. In this system, an insulating material 204, for example sprayed polyurethane foam, (SPUF) is applied starting at the inner surface of the sheathing material 202, and is applied to a thickness partially occupying the depth of the insulation cavity 203. Typically, closed-cell spray polyurethane foam has an R-value of approximately 6 $ft^{2.°}$ F.·h/Btu per inch of thickness. In this example, a total R-value of approximately 12 $ft^{2.°}$ F.·h/Btu can be achieved with approximately 2 inches depth of SPUF insulation 204. Alternatively, the insulating material may be fibrous insulation, and the insulation material may be applied in fibrous batts or preformed slabs of insulating material.

A higher R-value can be achieved, however, by creating an air gap 208 between the insulation layer and a low emittance surface 207 to create a reflective air space. A reflective air space consists of a low-emittance (emittance being the ratio of radiative flux of a body compared with black body emission at a given temperature) body, such as a metallic foil or film, and an air space or gap in contact with the low-emittance surface. A low-emittance metallic film, such as aluminum foil, in combination with an air gap enhances the thermal resistance of a wall system, depending on the depth of the air space or gap.

In FIG. 2, the regular paper-faced gypsum-containing wallboard is replaced by a foil backed gypsum-containing wallboard 206. In this system, the surface of the wallboard 206 facing the insulation cavity 203 is covered with a low emittance facing material 207, such as aluminum foil or metallized film, the low emittance facing material 207 facing the insulation cavity 203. The facing material 207 should have an emittance of less than 0.8 (approximately the emittance of gypsum-containing board), preferably less than 0.25, and most preferably less than 0.1. The installation of foil backed gypsum-containing wallboard 206 forms an air gap 208 between the low emittance facing material 207 from the insulating material 204. An air gap 208 is required in order for the low emittance facing material 207 to have an effect. In this system, an air gap 208 in excess of 0.75 inches, preferably 1 inch or more, will provide significant benefit. Here, since the insulation layer occupies 2 inches of the 3.5 inches of depth available with 2×4 in. studs, an approximately 1.5 inch air gap is formed between the insulating material and the metallic foil or film facing of the gypsum-containing wallboard. A low-emittance material 207 combined with an air gap of at least 1 inch, may enhance thermal resistance up to 4 $ft^{2.°}$ F.·h/Btu, according to data from Housing Research Paper 32 (U.S. National Bureau of Standards). Adding the R-value of the reflective air space to the R-value of a SPUF insulation layer may provide a total R-value of up to 16 $ft^{2.°}$ F.·h/Btu. A similar R-value can be obtained by increasing the thickness of the SPUF layer from 2 inches to approximately 2.75 inches without the reflective air space created by the foil-backed wallboard. However, such an application requires considerably more insulation material, at a higher cost than the reflective facing of the gypsum-containing wallboard provides.

Even greater R-values can be obtained using the system with 2×6 in. studs (having actual dimensions of 1.5 inches by 5.5 inches) rather than 2×4 in. studs. In one example, a cavity formed by 2×6 in. studs and having a SPUF layer of 3.5 inches, can potentially achieve an R-value of approximately 25 $ft^{2.°}$ F.·h/Btu, where otherwise a thick insulation layer would be required to achieve that performance in the absence of a reflective facing and air gap.

The gypsum-containing wallboard used in this invention must be specially modified in order to be compatible with the system of the invention. Foil backed gypsum-containing wallboards are known in the art, and are typically formed by laminating a layer of foil or metallized film onto the surface of a paper-faced gypsum-containing wallboard using an adhesive. Foil-backed gypsum-containing wallboards have been marketed in the past as a vapor barrier product, with the foil providing a strong protection against the penetration of water vapor, and typically have a water vapor permeance of 0.6 Perms (grains/ft$^2$·hr·in Hg), as opposed to 34 perms for typical ½ inch thick gypsum-containing wallboard. However, many cellular polymeric insulation materials, such as SPUF, are also vapor retarding materials. If the insulation cavity of a wall is filled on one side with a polymeric material with a low water vapor permeance, such as polyurethane foam and is faced on the other side with vapor-impermeable foil facing of gypsum-containing wallboard, there may be insufficient means of escape for moisture inside the insulation cavity. This condition may lead to problems such as the growth of mold inside the insulation cavity or warping of building components such as studs.

Figure 3:
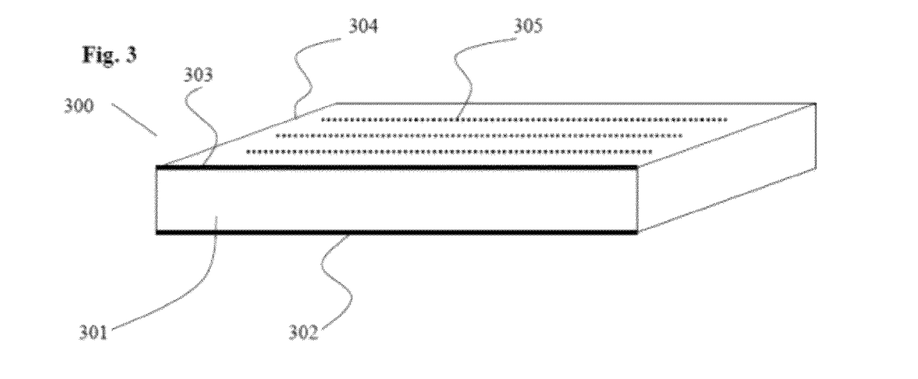
FIG. 3 is a side view of a foil-backed gypsum-containing wallboard that would be used in an insulated exterior wall structure according to the present invention.

An oblique cutaway view of modified gypsum-containing wallboard 300 usable in the invention is shown in FIG. 3. The wallboard 300 includes a gypsum core 301 that may be modified with mold and moisture resistance additives, fire resistance additives including glass fibers, foaming agents, starch, and other functional additives. The inside facing 302 is typically composed of kraft paper, although other facing materials, such as coated or uncoated glass fiber mats, may also be used. The outside facing 303 is also composed of kraft paper or glass fiber mat, or other suitable facing material. The paper facing may also contain mold resistance additives. Typically, a wallboard 300 is formed by applying a slurry of calcined gypsum (calcium sulfate hemihydrate) and core additives onto a moving sheet of kraft paper or glass mat. The slurry may include core additives that increase the moisture resistance or the mold resistance of the core. The slurry is spread to the predetermined thickness (typically ½ inch or ⅝ inch), and a second sheet of kraft paper or glass mat is laid on top of the slurry. The slurry is set and dried, forming a bond between the set gypsum core 300 and the inside and outside facings 302 and 303.

A metallized film or foil 304 is then applied to the outside facing 303 using any suitable adhesive, such as sodium silicate adhesive obtainable from PQ Corporation or Geo Specialty Chemicals. The low emittance surface of the foil is facing away from the gypsum core. The metallized film or foil 304 contains small perforations 305, which may be preformed during the manufacture of the film or foil 304. The perforations 305 of the metallized film or foil are sized and spaced on the gypsum-containing wallboard 300 so that the board has a vapor permeance of greater than 1 perm, preferably greater than 5 perms.

The metallized film or foil may be perforated before or after it is applied to the outside facing 303. Adding perforations to foil may result in the emittance of the foil increasing due to the loss of reflecting surface. The foil should not be so heavily perforated so that the emittance of the foil backing rises significantly. Preferably, the emittance of the foil should remain below 0.25, most preferably below 0.1.

Other embodiments using low-emittance surfaces on gypsum-containing wallboard are also possible. One alternative embodiment is the use of a low-emittance coating in place of foil. Currently available "low-e" coatings, such as BASF Radiance™ coatings, can reduce the emittance of a coated surface to below 0.25, and can be applied in a coating line after the production of paper-faced or fibrous mat-faced wallboard. Low-emittance coatings can also be made to be breathable, thus reducing or eliminating the need for perforation of the low-emittance surface.

Figure 5:
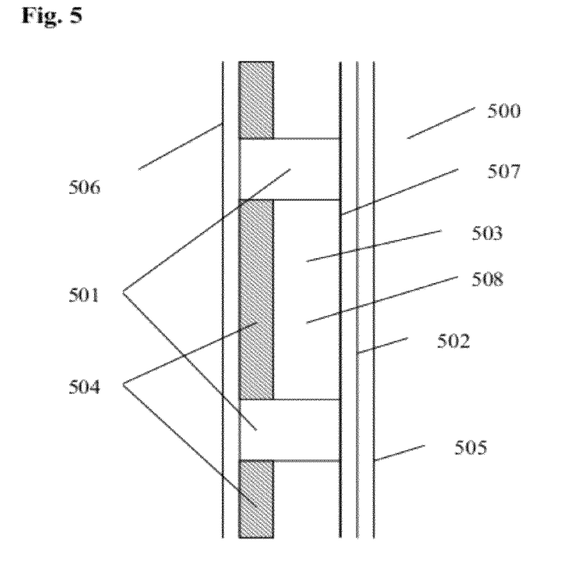
FIG. 5 is a cutaway view of a second insulated exterior wall structure according to the present invention.

FIG. 5 shows an alternative embodiment according to the invention, in which the insulation layer is applied to an interior wall facing. A series of 2×4 in. studs 501 are spaced 16 inches on-center between the studs. The studs are typically wooden, but may be metal or other material. The studs may also be 2×6 in. studs (having actual dimensions of 1.5 inches by 5.5 inches), especially in colder climes that require more insulation. Interior wallboard 506 is fastened to the interior facing ends of studs 501. The depth of the studs 501 and the surface of the wallboards 506 form an insulation cavity 503 where insulating material is applied. In this system, an insulating material 504, for example sprayed polyurethane foam (SPUF) or fibrous insulation, is applied starting at the exterior facing surface of the wallboards 506, and is applied to a thickness partially occupying the depth of the insulation cavity 503.

An exterior sheathing material 502 having a low-emittance material 507 on its interior-facing surface is nailed, screwed or otherwise affixed to the width of the studs 501. Siding material 505, such as shingles, vinyl siding, or wood slats, may be affixed to the exterior surface of sheathing material 502. An air gap 508 is formed between the low-emittance material 507 and the insulation layer 504.

Figure 5A:
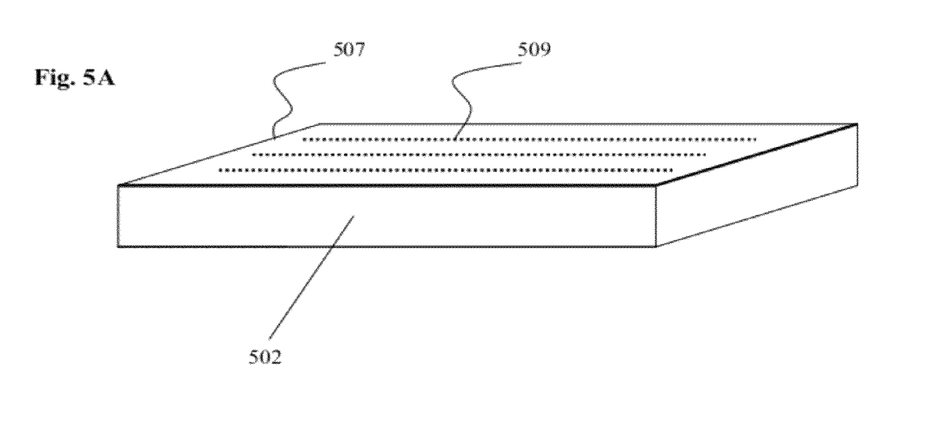
FIG. 5A is a side view of a foil-backed sheathing board that could be used in an insulated exterior wall structure according to the present invention.

The exterior sheathing material 502 may be any type of exterior sheathing such as those made from OSB, plywood, or gypsum, for example eXP Extended Exposure® sheathing made by National Gypsum Company of Charlotte, N.C. As shown in FIG. 5A, the sheathing 502 has affixed to its interior surface a metallized film or foil 507 which is applied using any suitable adhesive, such as sodium silicate, which may contain small perforations 509. These perforations which may be preformed during the manufacture of the film or foil 507. The perforations of the metallized film or foil 507 are sized and spaced on the sheathing 502 so that the board has a vapor permeance of greater than 1 perm, preferably greater than 5 perms.

As shown in FIG. 5A, the metallized film or foil 507 may be perforated before or after it is applied to the sheathing 502. Adding perforations to foil 507 may result in the emittance of the foil increasing due to the loss of reflecting surface. The foil should not be so heavily perforated so that the emittance of the foil backing rises significantly. Preferably, the emittance of the foil should remain below 0.25, most preferably below 0.1, and in no event greater than 0.8.

Other embodiments using low-emittance surfaces on gypsum-containing wallboard are also possible. One alternative embodiment is the use of a low-emittance coating in place of foil. Currently available "low-e" coatings, such as BASF Radiance™ coatings, can reduce the emittance of a coated surface to below 0.25, and can be applied in a coating line after the production of paper-faced or fibrous mat-faced wallboard. Low-emittance coatings can also be made to be breathable, thus reducing or eliminating the need for perforation of the low-emittance surface.

EXAMPLE 1

Figure 4:
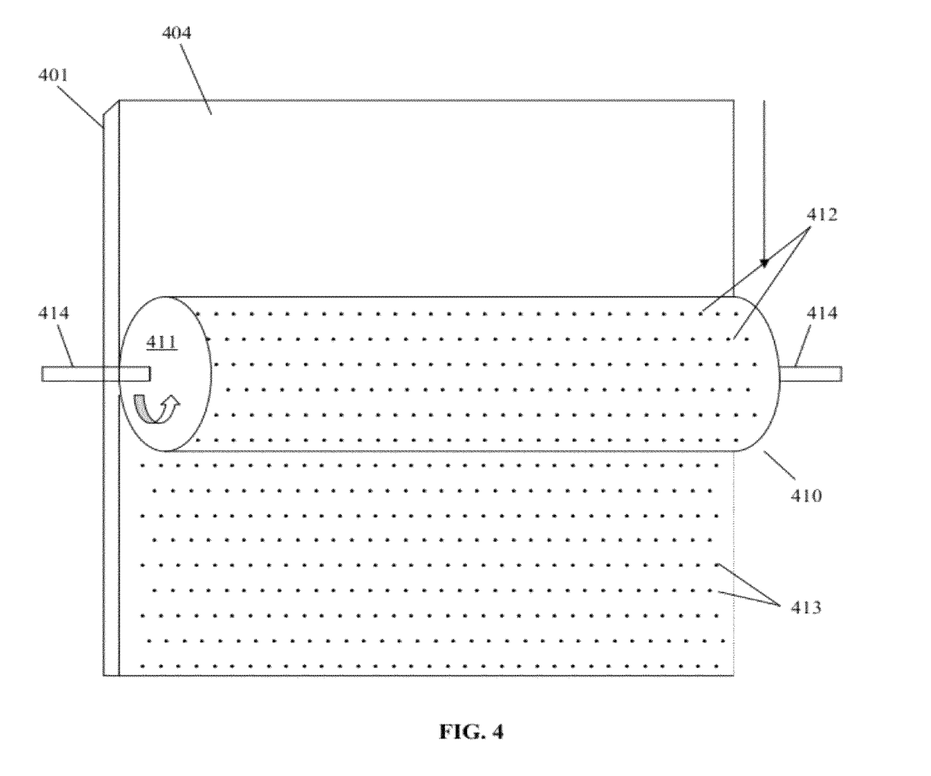
FIG. 4 is a top schematic view of a perforating process for a foil-backed gypsum-containing board according to the present invention.

As shown in FIG. 4, a metallic foil 404 having a minimum thickness of 0.00025 inches, laminated to 20-30# kraft paper, and an emittance of around 0.03, was laminated to a gypsum-containing wallboard 401 having a facing of paper, using sodium silicate as an adhesive. A perforating roller 410 that is a rotatable cylinder 411 was used to perforate the foil laminated board along a production line. The perforating roller 410 comprises a rotating cylinder 411 having a diameter of approximately 4 inches and a length, 47.5 inches, sufficient to cover the width of a gypsum-containing board. The cylinder is mounted on shafts 414 at either end, the shafts 414 being cylinders 1-¼ inch in diameter by 6 inches in length. The surface of the cylinder 411 had pins 412 that are 0.25 inches in height, measured from the cylinder 411, and taper from approximately 0.078 inches in diameter to a point along their height. The pins 412 (not shown to scale) are spaced ¼ inch in a diamond pin pattern. The perforating roller 410 was rolled (in the direction of arrow A) against unperforated foil-laminated board 401 along a production line (the board moving in the direction of arrow B), with the rolling contact occurring at a pressure of approximately 50 psi. The laminated board had perforations 413 sufficient to give the board a vapor permeance of greater than 10.4 Perms. When the roller 410 was rolled at a pressure of 40 psi, the laminated board had a vapor permeance of 8.6 Perms.

EXAMPLE 2

An evaluation by an outside testing service was carried out in order to compare the thermal performance of foil-backed wallboard in a spray polyurethane foam wall system in comparison with the same wall system faced with a traditional paper backed gypsum-containing wallboard, according to the protocol of ASTM C 1363-05.

Base Wall Construction: The base wall used in both tests of the example was 97-½ in.×96 in. (65 square feet). The base wall was comprised of nominal 2×4 vertical stud wall with studs mounted on 16 inch centers, and screwed together with 3 inch drywall screws. The framing members, in total, covered 8.81 square feet of the 65 square feet of the base wall, leaving 56.19 square feet of cavity space. The exterior was sheathed with ½ inch Oriented Strand Board (OSB), and screwed down with 1-¼ inch drywall screws every 12 inches vertically at each vertical stud location. The wall had six insulation cavities separated by the vertical studs, each insulation cavity having a depth of 3.5 inches. The insulation cavities were sprayed with BASF Comfort Foam® 178 Series polyurethane foam, nominally 2.0 lbs./ft$^3$ density, to an average depth of 2.18 inches from the OSB sheathing. The depth of the foam allowed an average air gap of approximately 1.33 inches.

Test #1 Description: Two sheets of ⅝ inch thick foil-backed wallboard, with the reflective surface facing inward towards the insulation cavity, were installed vertically onto the interior of the base wall. The foil-backed wallboard was screwed down with 1-¼ inch drywall screws every 12 inches vertically at each vertical stud location. The perimeter, seams, and screw heads were sealed with duct tape.

The foil backing of the wallboard of this test was a 30 lbs./ream foil/kraft laminate and had an emittance of 0.03. The foil backing in this example was pre-perforated and adhered to the paper facing of a wallboard using a sodium silicate adhesive of approximately 37% solids. The foil backing had circular perforations spaced approximately ¼ inch apart, and had a permeance of approximately 20 Perms. The board had a total measured permeance of 5.7 Perms.

Test #2 Description: Two sheets of ⅝ inch thick Gold Bond Brand Fire-Shield Gypsum Board was installed vertically onto the interior of the base wall. The Gold Bond Brand Fire-Shield Gypsum Board was screwed down with 1-¼ inch drywall screws every 12 inches vertically at each vertical stud location. The perimeter, seams, and screw heads were sealed with duct tape.

Twenty-two thermocouples to test the temperature were placed on each side of the test assembly, three vertically along each side of the insulation cavity, two more thermocouples on each side of the wallboard facing vertical studs, and two more along each side of the top and bottom plates.

During the test, the average interior side (side faced by gypsum wallboard) ambient temperature was held at 100.0° F., with the exterior side (side faced by OSB) held at 50.0° F. A 15 mph wind was applied to the exterior side of the test specimens. The sample was inspected for the formation of condensation, which may influence the surface temperature measurements. The sample showed no evidence of condensation at the conclusion of the test.

The thermal conductivity of the wood framing studs was measured at 0.757 BTU. in/ft$^2$·hr·F, translating to an R-value of 4.6 for a 3.5 inch deep wood stud.

TABLE I

Summary of Results

|  | Test 1 (Foil-backed gypsum-containing wallboard) | Test #2 (Gold Bond ® Fireshield wallboard) |
|---|---|---|
| Temperature Difference between surfaces | 46.25° F. | 46.00° F. |
| Heat Flow through Specimen | 228.58 BTU/hr | 256.28 BTU/hr |
| Area of Specimen | 65 ft$^2$ | 65 ft$^2$ |
| Specimen Thermal Resistance (surface to surface) | 13.15 | 11.67 |

The difference in R-value between specimens in this example, 1.48, is reduced by the presence of framing members, which have comparatively lower thermal performance. In order to determine the improvement in the R-value of the insulation cavity due to the presence of foil backed board, a calculation was carried out on the results to segregate the heat flow through the framing portion of the specimen from the heat flow through the insulated cavity portion of the specimen.

TABLE 2

Calculation of Improvement in Insulation Cavity R-value

|  | Test 1 (Foil-backed gypsum-containing wallboard) | Test #2 (Gold Bond ® Fireshield wallboard) |
|---|---|---|
| Area of framing in Specimen | 8.81 ft$^2$ | 8.81 ft$^2$ |
| Measured R-value of wood framing at 3.5 inches | 4.62 | 4.62 |
| ASHRAE Handbook R-value of ½ inch OSB | 0.68 | 0.68 |
| ASHRAE Handbook R-value of ⅝ inch gypsum-containing board | 0.57 | 0.57 |
| R-Value of framing portion of specimen (adding ASHRAE handbook R-values of ½ inch OSB and ⅝ inch gypsum-containing board) | 5.87 | 5.87 |
| Average temperature difference between surfaces as measured over framing members | 42.85° F. | 43.60° F. |
| Calculated heat flow through framing portion of sample (based on R-value of | 64.30 BTU/hr | 65.42 BTU/hr |

TABLE 2-continued

Calculation of Improvement in Insulation Cavity R-value

| | Test 1 (Foil-backed gypsum-containing wallboard) | Test #2 (Gold Bond ® Fireshield wallboard) |
|---|---|---|
| framing portion, temperature difference over framing members, and area of framing portion) | | |
| Calculated heat flow through insulation cavity (subtracting calculated heat flow through framing portion from total heat flow through specimen) | 164.28 BTU/hr | 190.86 BTU/hr |
| Area of insulation cavity of specimen | 56.19 ft² | 56.19 ft² |
| Average temperature difference between surfaces measured over insulation cavity | 47.01° F. | 46.53° F. |
| Calculated R-value through the insulation cavity | 16.08 | 13.70 |
| R-value of the foam and air gap (subtracting ASHRAE handbook values for gypsum-containing board and OSB) | 14.83 | 12.45 |

Through these calculations, it was found that the foil-backed gypsum-containing wallboard of Test 1 resulted in an R-value increase in the insulation cavity of 2.38 (the difference between 14.83 and 12.45). The calculated R-value for an air gap is 1.08, based on data from Housing Research Paper 32 (U.S. National Bureau of Standards). These results show that an air gap in conjunction with the foil backed wallboard of the invention would result in an air gap R-value of 3.46. An insulating cavity with a two inch thickness of an insulating foaming material can therefore be enhanced in a cost effective manner by using foil backing to enhance the thermal performance of the air gap between the foil-backed wallboard and the foam insulation.

While insulating wall structures, wall insulating methods, and foil-backed wallboards have been described in detail with reference to certain exemplary embodiments thereof, such are offered by way of non-limiting examples, as other versions are possible. It is anticipated that a variety of other modifications and changes will be apparent to those having ordinary skill in the art. For example, the use of an open cell foam insulation layer, as well as fibrous insulation is contemplated by this invention, applied to a thickness that provides an air gap between the insulation layer and the low-emittance surface. All such modifications and changes are intended to be encompassed within the spirit and scope of the invention as defined by the following and any later added claims.

The invention claimed is:

1. A gypsum-containing board, the gypsum-containing board having a core comprising gypsum, a first face and a second face, a low-emittance surface material on the second face that is a metallic foil or film having perforations that are sized and shaped by contacting the metallic foil or film with pins tapering to a point and spaced in a ¼ inch diamond pattern, the low-emittance surface material having an emittance of less than 0.25, the gypsum-containing board with low-emittance surface material having a water vapor permeance greater than 5 Perms.

2. The gypsum-containing board according to claim 1, wherein the low-emittance surface material is laminated to the second face of the board.

3. The gypsum-containing board according to claim 1, wherein the metallic foil or film is aluminum foil.

4. The gypsum-containing board according to claim 2, wherein the metallic foil or film is perforated before it is laminated to the second face of the board.

5. The gypsum-containing board according to claim 2, wherein the metallic foil or film is perforated after it is laminated to the second face of the board.

6. The gypsum-containing board according to claim 1, wherein the low-emittance surface material has an emittance of about 0.03 or less.

7. The gypsum-containing board according to claim 1 wherein the low-emittance surface material is adhered to a board facing, and the facing comprises glass fiber mat.

8. The gypsum-containing board according to claim 1 wherein the low-emittance surface material is perforated such that the water vapor permeance of the board is greater than 1 Perm.

9. The gypsum-containing board according to claim 1 wherein the low-emittance surface material is perforated such that the water vapor permeance of the board is greater than 5 Perms.

10. An insulated exterior wall system in a building comprising:
a. two framing studs placed a uniform distance apart along an exterior portion of a building, each of the studs having a length, a width and a depth, a surface spanning the width of each stud facing outward of the building, a second surface spanning the width of each stud facing inward into the building;
b. one or more sheathing boards fastened to the outward-facing surfaces of the studs so as to cover the area between the outward-facing surfaces of the studs, the sheathing boards having an outward face and an inward face;
c. one or more wallboards fastened to the inward-facing surfaces of the framing studs so as to cover the area between the inward-facing surfaces of the studs, the wallboards having an outward face and an inward face;
d. an insulation cavity having a depth equal to the depth of the studs defined by the studs, the sheathing boards, and the wallboards;
e. a low-emittance surface material that is a metallic foil or film having perforations that are sized and shaped by contacting the metallic foil or film with pins tapering to a point and spaced in a ¼ inch diamond pattern and having an emittance of less than 0.25 applied to one of the outward-facing surface of the wallboards or the inward-facing surface of the sheathing boards, wherein the wallboard or the sheathing board to which the low-emittance surface material is applied is a board with a core comprising gypsum and wherein the wallboard with low-emittance surface material has a water vapor permeance greater than 1 Perm;
f. a layer of insulating material applied to the other of the outward-facing surface of the gypsum-containing wallboards or the inward-facing surface of the sheathing boards, said layer filling the insulation cavity for a portion of the depth from the applied surface; and
g. an air gap in the insulation cavity between the low-emittance surface material and the layer of insulating material.

11. An insulated exterior wall system according to claim 10, wherein the low-emittance surface material is laminated to the wallboards or sheathing boards.

12. An insulated exterior wall system according to claim 10, wherein the metallic foil or film is aluminum foil.

13. An insulated exterior wall system according to claim 11, wherein the metallic foil or film is perforated so that the gypsum-containing board laminated with the metallic foil or film surface has a water vapor permeance greater than 5 Perms.

14. An insulated exterior wall system according to claim 10, wherein the low-emittance surface material is applied to the outward surface of the wallboards.

15. An insulated exterior wall system according to claim 10, wherein the low-emittance surface material is applied to the inward surface of the sheathing boards.

16. An insulated exterior wall system according to claim 10, wherein the studs are 2×4 lumber, having an actual width of approximately 1.5 inches and a depth of approximately 3.5 inches.

17. An insulated exterior wall system according to claim 10, wherein the studs are placed approximately 16 inches apart from one another.

18. An insulated exterior wall system according to claim 10, wherein the insulating material is a cellular plastic material.

19. An insulated exterior wall system according to claim 10, wherein the insulating material is polyurethane or polyisocyanurate foam.

20. An insulated exterior wall system according to claim 10, wherein the insulating material is fibrous insulation.

21. An insulated exterior wall system according to claim 10, wherein the insulating material is applied to the cavity by spraying, or applied as a preformed sheet or batt.

22. An insulated exterior wall system according to claim 10, wherein the low-emittance surface material has an emittance of about 0.03 or less.

23. An insulated exterior wall system according to claim 10, wherein the air gap extends for 0.75 inch or more of the depth of the insulation cavity.

24. An insulated exterior wall system according to claim 10, wherein the insulation is applied to a depth of 1.5 to 2.5 inches.

25. A method for insulating an exterior wall cavity, the wall cavity comprising the space between two or more studs placed a uniform distance apart, the studs having surfaces facing outward of the building, and surfaces facing inward into the building, the method comprising:
  a. applying one or more boards to one of the outward surfaces of the studs or the inward surfaces of the studs to partially enclose the exterior wall cavity;
  b. applying an insulation material to the boards so as to partially fill the depth of the exterior wall cavity; and
  c. fastening one or more reflective gypsum-containing boards to the other of the outward surfaces of the studs or the inward surfaces of the studs, wherein the reflective gypsum-containing boards have at least one face with a low-emittance surface material that is a metallic foil or film having perforations that are sized and shaped by contacting the metallic foil or film with pins tapering to a point and spaced in a ¼ inch diamond pattern, the low-emittance surface material having an emittance of less than 0.25 and wherein the gypsum containing boards with low-emittance surface material has a water vapor permeance greater than 1 Perm, the low-emittance surface material faces into the exterior wall cavity, and an air gap is created between the low-emittance surface material and the layer of insulating material.

26. The gypsum-containing board according to claim 1, wherein the pins contact the metallic foil or film at a pressure of at least about 40 psi.

27. The gypsum-containing board according to claim 1, wherein the pins have a height of 0.25 inches and taper from about 0.078 inches in diameter to a point, and contact the metallic foil or film occurs at a pressure of about 50 psi.

* * * * *